B. PAPKE.
CREAM SEPARATOR.
APPLICATION FILED DEC. 15, 1917.
1,273,916.
Patented July 30, 1918.
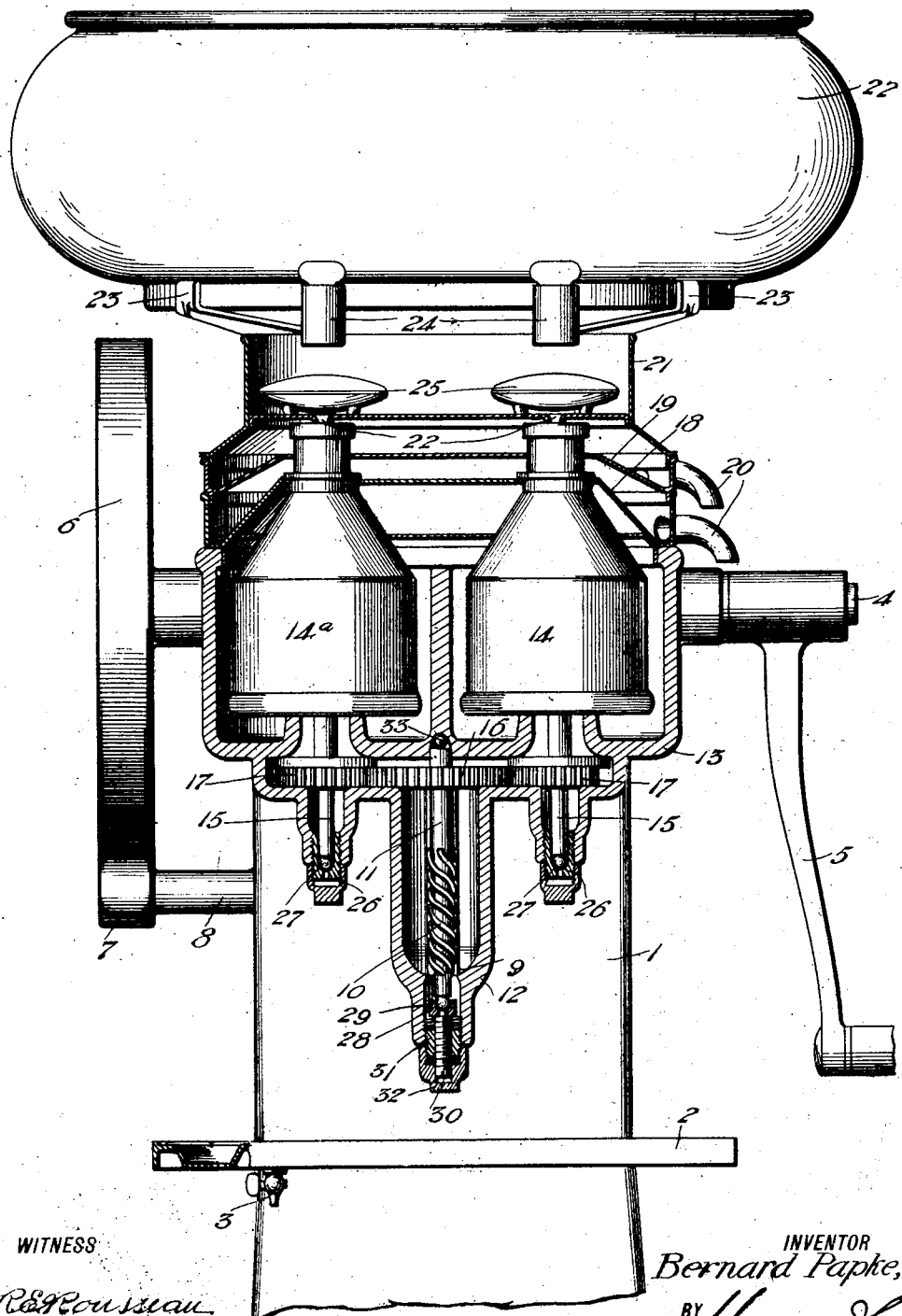
WITNESS
INVENTOR
Bernard Papke,
BY
ATTORNEYS

UNITED STATES PATENT OFFICE.

BERNARD PAPKE, OF LINCOLN, NEBRASKA.

CREAM-SEPARATOR.

1,273,916.     Specification of Letters Patent.     Patented July 30, 1918.

Application filed December 15, 1917. Serial No. 207,245.

*To all whom it may concern:*

Be it known that I, BERNARD PAPKE, a citizen of the United States, and a resident of Lincoln, in the county of Lancaster and State of Nebraska, have made certain new and useful Improvements in Cream-Separators, of which the following is a specification.

My invention is an improvement in cream separators, and consists in certain novel constructions and combinations of parts hereinafter described and claimed.

In the drawings is shown a sectional view of the improved separator.

In the present embodiment of the invention, a suitable base 1 is provided having arranged about the same a drain trough 2 provided with a discharge faucet 3. A shaft 4 is journaled transversely of the base at the top thereof, and the said shaft is provided at one end with a crank 5 and at the other with a spiral gear wheel 6.

This gear wheel meshes with a spiral pinion 7 on a countershaft 8 journaled on the base, and the said countershaft is provided at its inner end with a worm wheel 9, which engages a worm 10 on a vertical spindle 11, journaled in a dust-proof extension 12 from the casing 13 which carries the milk vessels 14 and 14ᵃ.

These vessels are journaled to rotate in the casing 13, and they are secured to spindles 15 also journaled in the casing.

The spindle 11 has a gear wheel 16, which meshes with pinions 17 on the spindles 15 and the pinions 17 are of the same size, so that the vessels will be rotated at the same speed.

Above the vessels, is arranged a pair of pans 18 and 19 for receiving the milk and cream respectively, and each of these pans has a discharge spout 20. A pan 21 is arranged above the pan 19, and this pan 20 has nipples 22 which deliver to the vessels 14 and 14ᵃ.

The supply vessel 21 is supported above the pan 19, by brackets 23, and the pan delivers by valves 24 to the respective milk vessels.

Floats 25 are arranged below the faucets 24, and the spindles 15 are arranged in step bearings 26, and rest upon balls 27 at their lower ends. Each of the step bearings as shown consists of an axially recessed plug which is threaded into the lower end of the casing 13, and is engaged by a cap at its lower end.

The lower end of the spindle 11 rests upon a ball 28 which is supported by a race, held by a screw 30 which is threaded through a plug 31 having threaded engagement with the lower end of the extension 12.

A cap 32 is threaded onto the lower end of the plug. The spindle 11 engages at its upper end a ball 33.

It will be understood that the bowls or vessels 14—14ᵃ have axes in alinement with the spindle 11 and are upon opposite sides of the said spindle.

It will also be understood that any number of bowls might be used, the said bowls being arranged with their axes in a circle whose center is the spindle 11.

I claim:—

A cream separator comprising a base, a vertical spindle journaled in the base, vertical spindles arranged about the central spindle in a circle whose center is the central spindle and spaced apart from each other at equal distances, a separator bowl connected to the top of each of the last named spindles to rotate therewith, a driving connection between the central spindle and the bowl spindles for rotating said bowl spindles at the same speed, means for driving the central spindle, a common vessel for receiving the milk from all of the bowls, a common vessel for receiving the cream from all of the bowls, said vessels being arranged one above the other, a common means for delivering the milk and the cream to the bowls and arranged above the bowls and above the vessels, a driving shaft arranged transversely of the central spindle, and a connection between the said shaft and the said spindle for rotating the same.

BERNARD PAPKE.

Witnesses:
   JOHN WRIGHT,
   OLIVE FREY.

*Copies of this patent may be obtained for five cents each, by addressing the "Commissioner of Patents, Washington, D. C."*